United States Patent [19]
Nakagawa et al.

[11] Patent Number: 5,331,848
[45] Date of Patent: Jul. 26, 1994

[54] MISFIRING DETECTING METHOD AND APPARATUS

[75] Inventors: Akihiro Nakagawa; Akira Demizu, both of Himeji, Japan

[73] Assignee: Mitsubishi Denki Kabushiki Kaisha, Tokyo, Japan

[21] Appl. No.: 819,743

[22] Filed: Jan. 13, 1992

[30] Foreign Application Priority Data

Jan. 14, 1991 [JP] Japan .................................. 3-015967

[51] Int. Cl.$^5$ .......................................... G01M 15/00
[52] U.S. Cl. ...................................... 73/116
[58] Field of Search .................. 73/116, 117.3, 35; 364/431.07, 431.08; 340/439; 123/419, 479, 436

[56] References Cited

U.S. PATENT DOCUMENTS

| | | | |
|---|---|---|---|
| 3,679,894 | 7/1972 | Smith | 324/162 |
| 3,972,230 | 8/1976 | Hanson et al. | 73/116 |
| 4,123,935 | 11/1978 | Maringer | 73/116 |
| 4,295,363 | 10/1981 | Buck et al. | 73/117.3 |
| 4,532,592 | 7/1985 | Citron et al. | |
| 5,041,980 | 8/1991 | Maddock et al. | 73/116 |
| 5,088,318 | 2/1992 | Osawa | 73/117.3 |
| 5,095,742 | 3/1992 | James et al. | 73/116 |

FOREIGN PATENT DOCUMENTS 4131383 3/1992 Fed. Rep. of Germany .
26345 2/1987 Japan .

OTHER PUBLICATIONS

SAE-PAP, "Methods of On-Board Misfire Detection" Gunther Plapp et al., pp. 9-20.

Primary Examiner—Robert Raevis
Attorney, Agent, or Firm—Sughrue, Mion, Zinn, Macpeak & Seas

[57] ABSTRACT

A method and apparatus capable of detecting the occurrence of misfiring in an internal combustion engine with high reliability over a wide engine operation range with a simplified structure. Starting from a fact that an engine acceleration changes in dependence upon combustion states in the engine cylinders, a ratio between two periods before and after a predetermined crank angle reference position is successively determined. An angular acceleration of the crankshaft is then determined on the basis of a difference between a current ratio and a preceding ratio for each cylinder. Subsequently, a change in the crankshaft acceleration is determined for comparison with a predetermined value at every ignition timing for each cylinder. If the change exceeds the predetermined value, it is determined the occurrence of misfiring. The method can be carried out by making use of only an output signal of a crank angle sensor which is usually utilized for ignition timing control of the engine.

24 Claims, 8 Drawing Sheets

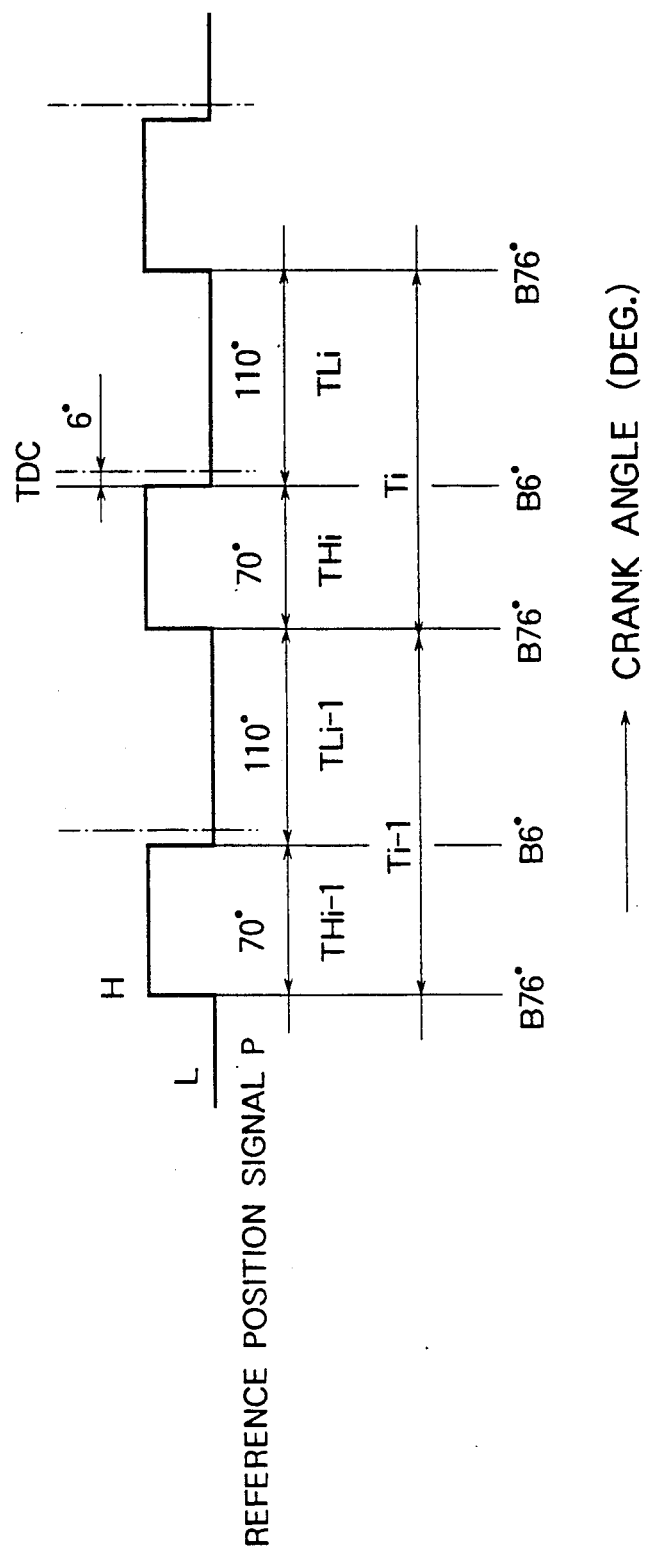

MISFIRING DETECTING METHOD AND APPARATUS

BACKGROUND OF THE INVENTION

The present invention generally relates to a misfiring detecting method and apparatus for detecting the occurrence of misfiring in an internal combustion engine. More particularly, the present invention is concerned with a method and apparatus for detecting the occurrence of misfiring on the basis of a change in angular acceleration of the crankshaft of an engine in a predetermined angular range across a predetermined crank position.

Misfiring is a phenomenon which occurs in an internal combustion engine when at least one of the cylinders of the engine fails to ignite. Misfiring can be due to a number of causes, such as the failure of an ignition system to produce an adequate spark in a cylinder or the failure of a fuel supply system to supply a proper amount of air/fuel mixture to a cylinder. When misfiring is due to a failure of the ignition system, uncombusted fuel will be discharged from the misfiring cylinder. The discharge of uncombusted fuel is of course undesirable, because it can cause environmental pollution or a catalytic converter of the engine may be damaged. Therefore, it is desirable to detect misfiring in an engine and then cut off the supply of fuel to a misfiring cylinder.

For this reason, various misfiring sensing or detecting methods have been proposed, a typical one of which is disclosed in Japanese Published Unexamined Patent Application No. 62-26345 (JP-A-62-26345). According to this known method, pressure within each cylinder of an engine is constantly monitored by a pressure sensor, and the crankshaft angle at which a maximum pressure prevails in each cylinder is determined. When the maximum pressure for each cylinder falls within a prescribed period defined by two crank angles, the engine is considered to be operating normally.

The known method and apparatus, however, suffer a number of shortcomings. For example, it is necessary to continuously monitor the cylinder pressure, so the system structure tends to be complicated. Furthermore, when the engine is operating under a light load, the pressure in each cylinder has two peaks, one occurring at top dead center during the compression stroke and the other occurring during the combustion stroke, and it is difficult to discriminatively identify the two peaks. Besides, when a pressure peaks occurs prior to top dead center during the compression stroke of a cylinder, it is not possible to detect misfiring.

SUMMARY OF THE INVENTION

Accordingly, the present invention is aimed at eliminating the above-mentioned shortcomings of the known method and apparatus.

It is an object of the present invention to provide a misfiring detecting method and apparatus which can reliably detect the occurrence of misfiring over a wide operation range of an internal combustion engine with a simplified structure.

It is another object of the present invention to provide a misfiring detecting method and apparatus which are capable of detecting misfiring in a cylinder with enhanced reliability.

It is a further object of the present invention to provide a misfiring detecting method and apparatus which are capable of detecting the occurrence of external disturbances affecting engine operation as well.

In view of the above and other objects which will be more apparent as description proceeds, there is provided according to a first aspect of the invention a method of detecting the occurrence of misfiring in an internal combustion engine including at least one cylinder and a crankshaft operatively coupled to the cylinder, the method comprising the steps of: successively determining an angular acceleration of the crankshaft at a predetermined crank position for the cylinder; determining a change between a current angular acceleration and a preceding angular acceleration of the crankshaft; comparing the change between the current and preceding angular accelerations with a predetermined value; and deciding the occurrence of misfiring in the cylinder when the change in the angular acceleration exceeds the predetermined value.

According to a second aspect of the invention, there is provided a method of detecting the occurrence of misfiring in an internal combustion engine including at least one cylinder and a crankshaft operatively coupled to the cylinder, the method comprising the steps of: successively determining a time ratio representing a ratio between a time taken for the crankshaft to rotate a first predetermined angular distance extending in precedence to a predetermined angular reference position of the crankshaft and a time taken for the crankshaft to rotate a second predetermined angular distance extending in succession to the predetermined angular reference position; determining an angular acceleration of the crankshaft on the basis of a difference between the time ratios determined in current and preceding engine cycles, respectively; determining a change in the angular acceleration at a predetermined crank position for the cylinder; comparing the change in the angular acceleration with a predetermined value; and deciding the occurrence of misfiring in the cylinder when the change in the angular acceleration exceeds the predetermined value.

According to a third aspect of the invention, there is provided a method of detecting the occurrence of misfiring in an internal combustion engine including a plurality of cylinders operating in a predetermined sequence and a crankshaft operatively coupled to the cylinders, the method comprising the steps of: determining a time ratio representing a ratio between a time taken for the crankshaft to rotate a first predetermined angular distance extending in precedence to a predetermined angular reference position of the crankshaft and a time taken for the crankshaft to rotate a second predetermined angular distance extending in succession to the angular reference position; determining an angular acceleration of the crankshaft on the basis of a difference between the time ratios determined in successive engine cycles; successively determining a change in the angular acceleration at a predetermined crank position for each of the cylinders; comparing the change in the angular acceleration with a predetermined value; and deciding the occurrence of misfiring in one of the cylinders which was last ignited if the change in the angular acceleration exceeds the predetermined value.

According to a fourth aspect of the invention, there is provided a method of detecting the occurrence of misfiring in an internal combustion engine including a plurality of cylinders operating in a predetermined sequence and a crankshaft operatively coupled to the cylinders, the method comprising the steps of: determining a time ratio representing a ratio between a time taken for the crankshaft to rotate a first predetermined angular distance extending in precedence to a predetermined angular reference position of the crankshaft and a time taken for the crankshaft to rotate a second predetermined angular distance extending in succession to the angular reference position; determining an angular acceleration of the crankshaft on the basis of a difference between the time ratios determined in current and preceding engine cycles, respectively; determining a first quantity representing a change in the angular acceleration at a first predetermined crank position for a given one of the cylinders; comparing the first quantity with a first predetermined value; determining a second quantity representing a change in the angular acceleration at a second predetermined crank position for a succeeding cylinder operating in succession to the given cylinder; comparing the second quantity with a second predetermined value; and deciding the occurrence of misfiring in one of the cylinders which was last ignited if the first quantity exceeds the first predetermined value and if the second quantity exceeds the second predetermined value.

If the first quantity is greater than the first predetermined value and if the second quantity is smaller than the second predetermined value, it is decided that an external disturbance affecting engine operation takes place.

Further, the present invention provides apparatuses for carrying out the methods described above.

With the teachings of the present invention, occurrence of misfiring can reliably be detected with a much simplified structure without the need for providing pressure sensors in association with the engine cylinders as with the case of the known technique. In reality, for carrying out the present invention, it is sufficient to utilize the output signal of a crank angle sensor which is conventionally used for ignition timing control. Thus, the present invention can be practiced very inexpensively while assuring enhanced reliability for the detection of occurrence of misfiring to great advantages.

These and other advantages and attainments of the present invention will become apparent to those skilled in the art upon a reading of the following detailed description when taken in conjunction with the accompanying drawings.

BRIEF DESCRIPTION OF THE DRAWINGS

FIG. 3 is a fragmental waveform diagram showing a portion of the waveform of FIG. 2B on an enlarged scale;

DESCRIPTION OF THE PREFERRED EMBODIMENTS

The present invention will now be described in detail in conjunction with exemplary or preferred embodiments thereof while referring to the accompanying drawings.

Figure 1:
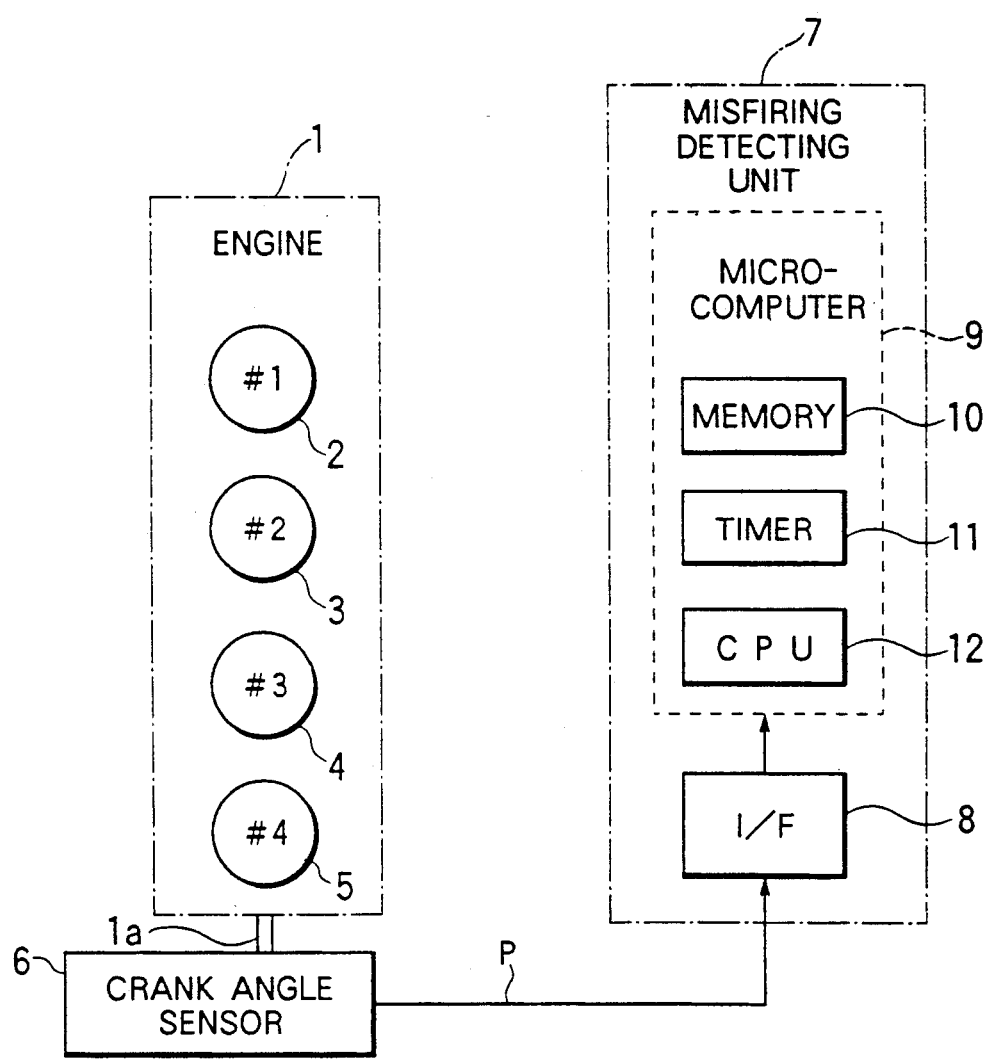
FIG. 1 is a block diagram showing the general arrangement of a misfiring detecting apparatus to which teachings of the present invention are embodied.

FIG. 1 is a block diagram showing the general arrangement of an apparatus for detecting the occurrence of misfiring in an internal combustion engine according to an embodiment of the invention. In this figure, the engine, generally denoted by reference numeral 1, is shown, by way of example only, as a four-cycle four-cylinder engine which includes four cylinders 2 to 5 labeled with identification numbers #1 to #4, respectively. Installed in association with a crankshaft or camshaft 1a which is operatively coupled to an output shaft of the engine 1 is a crank angle sensor 6 for sensing angular positions of the crankshaft 1a and producing a pulse-like reference position signal P which is utilized for ignition control on the cylinders 2 to 5.

Connected to the output of the crank angle sensor 6 is a misfiring detection unit 7 for detecting the occurrence of misfiring in the engine cylinders 2 to 5 by processing the reference position signal P from the crank angle sensor 6. The misfiring detecting unit 7 includes an interface (I/F) 8 for fetching and shaping the reference position signal P, and a microcomputer 9 which is supplied with the reference position signal P via the interface 8.

The microcomputer 9 includes a memory 10 for storing signal processing procedures or programs, control information and data as required, a timer 11 in the form of a free-running counter for counting pulses of a basic clock signal supplied thereto at predetermined time intervals and a central processing unit or CPU 12 for executing arithmetic or logical processings for detecting the occurrence of misfiring. More specifically, the microcomputer 9 functions to determine on the basis of the reference position signal P a time ratio between a first period in time taken for the crankshaft 1a to rotate a first predetermined angular distance which extends in precedence to a predetermined reference crank angle or position (e.g. top dead center or TDC), and a second period taken for the crankshaft 1a to rotate a second predetermined angular distance which extends in succession to the predetermined reference crank angle, for thereby determining an angular acceleration of the crankshaft 1a on the basis of a change in the time ratio, whereon decision is made as to the occurrence of misfiring on the basis of the magnitude of change in the angular acceleration, as will be described in more detail later on.

Figure 2A:
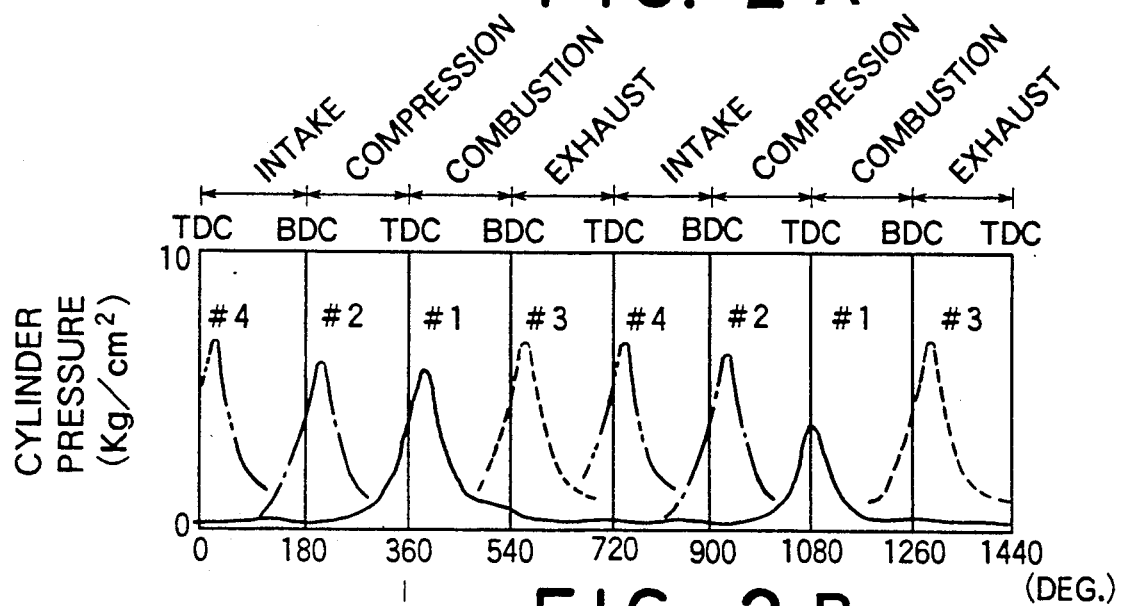
FIGS. 2A to 2D are waveform diagrams for illustrating the concept underlying the misfiring detection taught by the present invention.
Figure 2B:
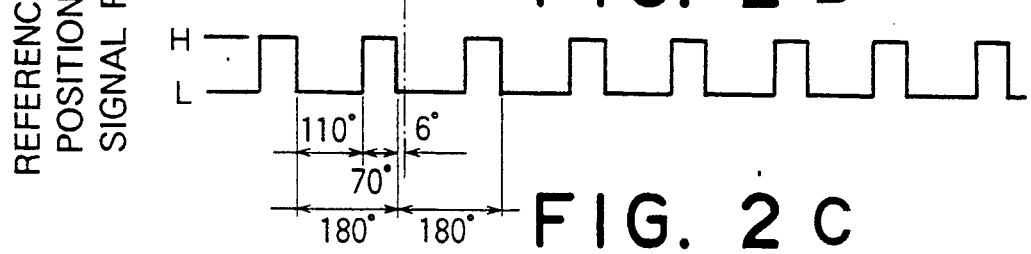
Figure 2C:
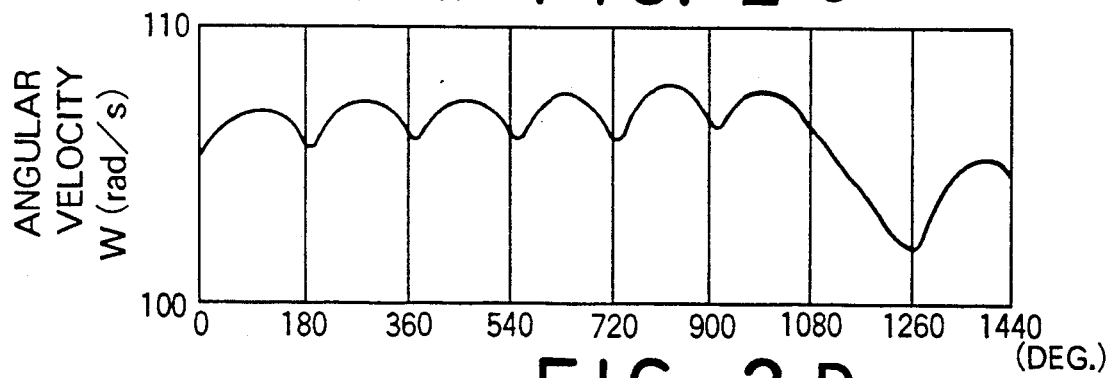
Figure 2D:
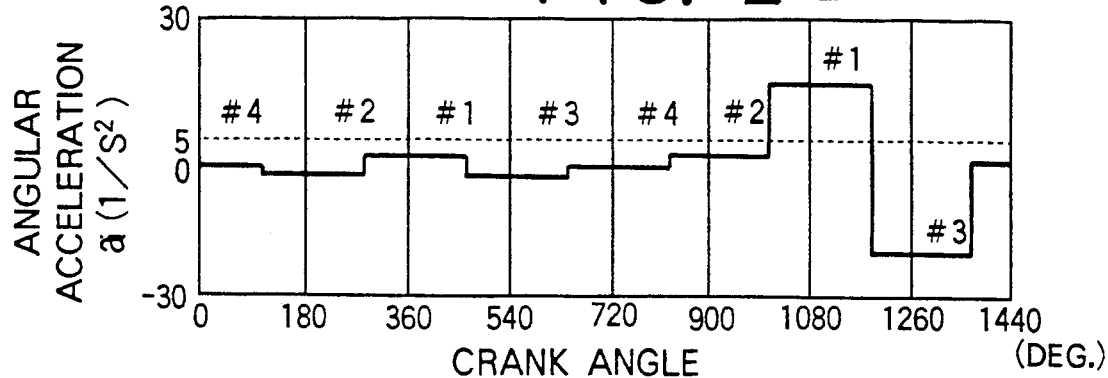

Next, the concept underlying the present invention will be described by particular reference to FIGS. 2A, 2B, 2C and 2D which show relations among the cylinder pressure, the reference position signal P, an angular velocity w and the angular acceleration $a_i$ at the times of ignition and combustion, wherein FIG. 2A is a waveform diagram illustrating changes in the pressure within the #1 cylinder 2 (shown by a solid line curve); FIG. 2B is a waveform diagram showing the reference position signal P; FIG. 2C is a waveform diagram of the angular velocity w of the crankshaft 1a; and FIG. 2D shows a waveform diagram for illustrating changes in the angular acceleration $a_i$. Throughout FIGS. 2A to 2D, the crank angle in the range of 0° to 1440° is taken along the abscissa. Further, in FIG. 2A, the cylinder pressures generated within the #2 to #4 cylinders 3 to 5 during the explosion strokes are represented by a single-dot broken curve, a broken curve and a double-dot broken curve, respectively.

In the case of a four-stroke four-cylinder engine, an intake stroke, a compression stroke, an explosion stroke and an exhaust stroke take place successively and repetitively in each of the cylinders, wherein cylinder cycles each including the four strokes mentioned above sequentially realized in the order of the #1 cylinder, #3 cylinder, #4 cylinder and #2 cylinder with a phase difference of 180° relative to one another, as can be seen in FIG. 2A. Considering the #1 cylinder 2 of which pressure change is represented by a solid line curve in FIG. 2A, the explosion stroke is repeated at every crank angle of 720°, wherein the piston in the #1 cylinder reaches top dead center at every angle of 0°+360° xn (n represents an integer) and bottom dead center at every angle of 180°+360° xn.

As can be seen in FIG. 2B, the reference position signal P supplied from the crank angle sensor 6 to the CPU 12 via the interface 8 is a periodical pulse signal having a level changing at a crank angle reference position corresponding to the ignition timing for each of the #1, #2, #3 and #4 cylinders, the pulse signal containing a series of pulses each rising up at a first crank angle reference position (e.g., 76° before TDC) located in precedence to a position corresponding to the ignition timing of each cylinder and falling at a second crank angle reference position (e.g., 6° before TDC). Each pulse periodically appears at an angular distance of 180° from each other and has a low level duration corresponding to an angular range of 110° (hereinafter referred to as a L-level interval) and a high level duration corresponding to 70° (hereinafter referred to as a H-level interval), wherein these intervals repetitively appear in an alternate manner.

In general, the supply and cut off of the power supply to an ignition coil (not shown) provided for each of the cylinders is controlled on the basis of the reference position signal P. By way of example, let us consider the #1 cylinder 2. Each ignition coil is energized during a corresponding H-level interval of the reference position signal P in the course of the compression stroke which takes place within a crank angle range of 180° to 360°. The power supply to each ignition coil is then cut off at an ignition time point which is set in dependence on the engine rotational speed (rpm) as well as the engine load with reference to a level change in the reference position signal P from the H level to the L-level which takes place in the vicinity of TDC (e.g., around 6° before TDC). As a result of this, a high voltage is generated by an ignition coil and applied to a corresponding spark plug to ignite the air/fuel mixture compressed within the #1 cylinder 2. Consequently, the explosion stroke takes place during a period corresponding to a crank angle range of 360° to 540°, so that the pressure in the cylinder 2 increases, as can be seen in FIG. 2A.

Through the similar control process, ignitions for the other cylinders #3, #4, and #2 are sequentially performed periodically at an interval of 180°, whereby the combustion cycles of the individual cylinders are repeated in the order mentioned previously.

The cylinder pressure waveform of the #1 cylinder 2 shown in FIG. 2A around a crank angle of 360° represents normal combustion. More specifically, the air/fuel mixture charged into the #1 cylinder 2 during the intake stroke (e.g., in a crank angle range of from 0° to 180°) is compressed during the compression stroke (from 180° to 360°), ignited or fired closely before TDC (360°) during the compression stroke, expanded explosively during the explosion stroke (from 360° to 540°) and discharged from the cylinder during the exhaust stroke. It should be noted that in the case of normal combustion, the cylinder pressure curve is symmetrical with respect to a vertical line representative of TDC.

On the other hand, the cylinder pressure waveform around a crank angle of 1080° in FIG. 2A represents a state in which failure to fire occurs or the air/fuel mixture does not undergo combustion at all (complete misfiring) due to an improper mixing ratio of air and fuel, improper ignition timing, and the like. It will be seen that the waveform is symmetrical with respect to TDC (1080°) with a low peak of the cylinder pressure. In that case, when the misfiring is not significant, a pressure change during the explosion stroke assumes a level intermediate between a pressure change under normal combustion occurring in a crank angle range of from 360° to 540° and a pressure change at the time of complete misfiring.

FIG. 2C shows a change in the angular velocity of the crankshaft 1a on the presumption that the engine rotational speed is 1000 rpm, by way of example. As will be seen from this waveform, the angular velocity w exhibits such a characteristic that it increases as a function of increase in the engine output torque generated during the explosion stroke of each cylinder and decreases as the torque decreases during the compression stroke.

Now, let us assume that misfiring takes place in the #1 cylinder 2 at a crank angle of 1080°. In this case, torque does not increase even after the crank angle of 1080° because of failure or absence of explosion, as a result of which the angular velocity w of the crankshaft 1b continues to decrease until the succeeding explosion stroke of the #3 cylinder 4 begins, as can be seen from FIG. 2C.

Next, referring to FIG. 3, description will be turned to the acceleration $\alpha_i$ which is used as a basis for making decision as to the occurrence of misfiring according to the teachings of the invention.

FIG. 3 is a waveform diagram illustrating the reference position signal P on an enlarged scale. In this figure, $TH_{i-1}$ and $TH_i$ represent durations of the H-level interval of a preceding pulse and a current pulse, respectively, of the reference position signal P; $TL_{i-1}$ and $TL_i$ represent durations of the L-level interval of the preceding pulse and the current pulse, respectively; $T_{i-1}$ and $T_i$ represent periods of the preceding pulse and the current pulse, respectively, of the reference position signal P; and B76° and B6° represent crank angle positions of a rising edge and a falling edge, respectively, of each pulse. In this conjunction, it should be mentioned that the suffix "−1" indicates the preceding engine cycle, while the symbols without the suffix represents the current engine cycle, wherein one cycle includes the four strokes, as mentioned previously.

In general, in a circular motion, an angular acceleration $\alpha$ (rad/sec₂) can be expressed by the following equation:

$$\alpha = (w_i - w_{i-1})/T_i \tag{1}$$

where $w_i$ represents an angular velocity in the current period $T_i$ of the reference position signal P, and $w_{i-1}$ represents an angular velocity in the preceding period $T_{i-1}$.

The angular velocity $w_i$ is given by the following equation:

$$w_i = 4\pi/(C \times T_i) \qquad (2)$$

where C represents the number of the cylinders. From equations (1) and (2) above, the angular acceleration $\alpha$ indicating the time rate of change of the angular velocity $w_i$ is given by the following equation:

$$\alpha = [4\pi/(C \times T_i)] \times (T_i/T_i^2 - T_{i-1}/T_{i-1}^2) \qquad (3)$$

Representing $T_{i-1}$ as $$T_{i-1} = T_i + \delta T_i$$

and assuming that $$\delta T_i^2 << 1,$$

then the following equation can be valid:

$$T_i^2 = T_{i-1}^2$$

Accordingly, equation (3) above may be rewritten as follows:

$$\alpha = (4\pi/C) \times [(T_i - T_{i-1})/T_i^3] \qquad (4)$$

A relation between the intervals $TH_i$ and $TL_i$ and the period $T_i$ is given by the following equation:

$$T_i = TH_i + TL_i$$

Now, a ratio $RT_i$ between the temporal intervals $TH_i$ and $TL_i$ is represented by the following equation:

$$RT_i = TL_i/TH_i$$

In the above equation defining the temporal or time ratio $RT_i$, the term $TH_i$ representing the length of the H-level interval gives information about the quantity of intake air charged in the compression stroke, and thus the above definition of the time ratio $RT_i$ gives standardization of the L-level interval $TL_i$ by the air intake quantity.

Assuming at this juncture that the charged air quantity is invariable independent of the individual cylinders, then the following equation will be established:

$$TH_i = TH_{i-1}$$

Accordingly, using the following equation:

$$\delta T_i = T_{i-1} - T_i = TL_{i-1} - TL_i,$$

equation (4) above can be rewritten as follows:

equation (4) above can be rewritten as follows:

$$\alpha = (4\pi/C)(TH_i/T_i^3)(RT_{i-1}) \qquad (5)$$

For deciding the occurrence of misfiring, the constant term of $(4\pi/C)$ may be eliminated, so the angular acceleration $\alpha_i$ (rad/sec$^2$) may be expressed as follows $$\alpha_i = (TH_i/T_i^3)(RT_i - RT_{i-1}) \qquad (6)$$

FIG. 2D shows the angular accelerations $\alpha_i$ successively and sequentially calculated in accordance with equation (6) above for the individual cylinders. As will be understood from FIG. 2D and the equation (6), upon occurrence of misfiring (at a crank angle of 1080° in the case of the #1 cylinder 2), the angular acceleration $\alpha_i$ of the crankshaft 1a increases transiently beyond the acceleration in the normal combustion phase, while it decreases significantly at the succeeding ignition time point (at a crank angle of 1260°) for the #3 cylinder 4.

The present invention starts from the observation described above. Now, a first embodiment of the invention will be described in detail while referring to the flow charts shown in FIGS. 4 and 5. The first embodiment is incarnated on the basis of the fact that the angular acceleration $\alpha_i$ of the crankshaft at the ignition time point for one and the same cylinder changes in dependence on the combustion state.

Figure 4:
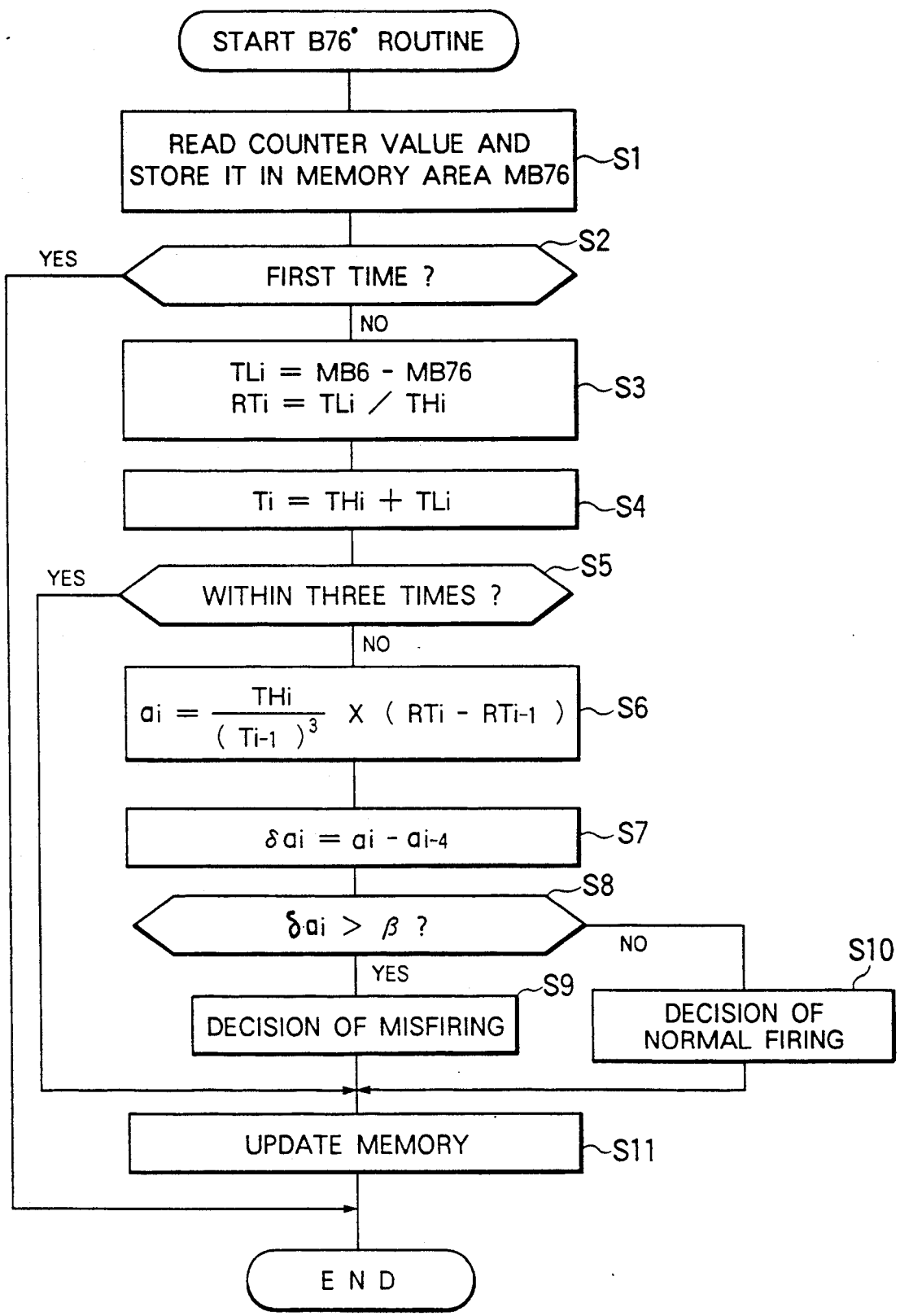
FIG. 4 is a flow chart showing a so-called B76° routine executed according to a first embodiment of the invention.
Figure 5:
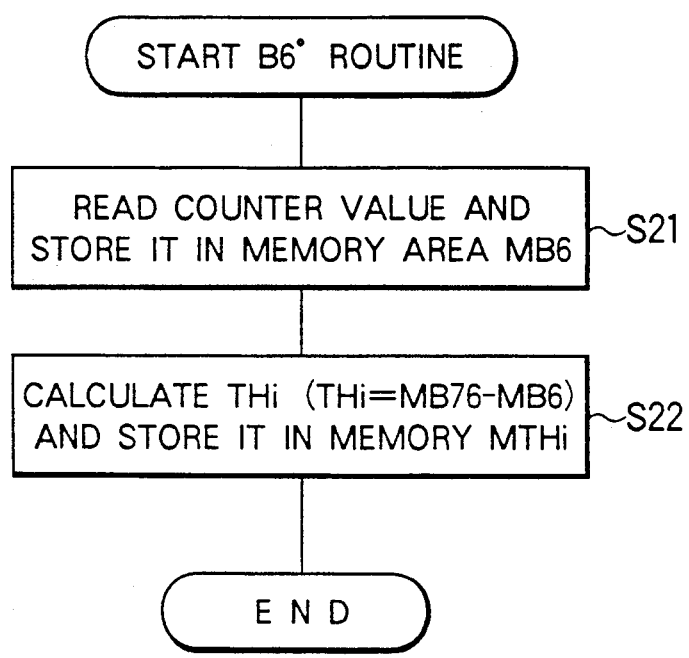
FIG. 5 is a flow chart showing a so-called B6° routine which is common to several embodiments of the present invention hereinafter disclosed.

FIG. 4 illustrates a processing routine executed by the microcomputer 9 at the rising or leading edge of each pulse of the reference position signal P (at every reference crank angle of 76° BTDC), and FIG. 5 illustrates a processing routine executed at the falling or trailing edge of each pulse of the reference position signal P (at every reference crank angle of 6° BTDC). The processing routine of FIG. 4 will hereinafter be referred to as a B76° routine while that of FIG. 5 is termed as a B6° routine. These B76° and B6° routines are previously programmed and stored in the memory 10. Further, a predetermined value $\beta$ used in making decision as to the occurrence of misfiring is also previously established and determined empirically in consideration of the cylinder pressure actually prevailing after misfiring.

Referring to FIG. 4, when an interruption takes place to start the B76° routine at the reference crank angle B76° of the reference position signal P, the CPU 12 reads out the count value from the timer 11 to store the value in a memory area MB76 of the memory 10 (step S1). At that time, the count value as stored indicates the time corresponding to the reference crank angle 76° BTDC.

Subsequently, a flag (not shown) is checked to decide whether or not the processing in step S1 is the first processing since activation of the program (step S2). Needless to say, the flag checked at this time is so set as to indicate that the above-mentioned step is the first to be executed.

If it is decided in step S2 that the processing in step S1 is the first for execution, the flag is cleared, whereupon the B76° routine shown in FIG. 4 comes to an end.

Upon appearance of the falling edge of a pulse of the reference position signal P at 6° BTDC in the course of engine rotation, the CPU 12 executes the B6° routine shown in FIG. 5.

More specifically, the CPU 12 reads out the count value from the timer 11 to store the value indicative of the time point corresponding to the crank angle of 6° BTDC in a memory area MB6 (step S21).

Subsequently, the time point at 76° BTDC stored in the memory area MB76 at step S1 in the B76° routine, as mentioned previously, is read out to calculate the length of the H-level interval $TH_i$ (i.e., a crank angle range of from 76° BTDC to 6° BTDC) of the current reference position signal P in accordance with the following equation:

$$TH_i = MB76 - MB6 \tag{7}$$

The value resulting from this calculation is stored in a memory area $MTH_i$ (step S22), and thereafter the B6° routine comes to an end.

Upon reaching the crank angle reference position 76° BTDC at which an ignition signal for the succeeding cylinder (e.g., the #3 cylinder) is generated, the B76° routine shown in FIG. 4 is again executed, as a result of which the value stored in the memory area MB76 in step S1 of the 76° routine is updated.

In step S2, it is decided that the current processing is not the first execution because the flag has been cleared in the preceding processing. Thus, the B76° routine proceeds to step S3.

In step S3, the time data at a crank angle of 6° BTDC which has been stored in the memory area MB6 in step S21 of the B6° routine shown in FIG. 5 is read out to calculate the temporal length of the L-level interval $TL_i$ (i.e., a crank angle range of from 6° BTDC to 76° BTDC) of the current reference position signal P in accordance with the following equation:

$$TL_i = MB6 - MB76 \tag{8}$$

The result of this calculation is stored in a memory area $MTL_i$. At the same time, the time ratio $RT_i$ in the current reference temporal lengths or times $TH_i$ and $TL_i$ in accordance with the following equation:

$$RT_i = TL_i / TH_i \tag{9}$$

Subsequently, in step S4, the period $T_i$ of the reference position signal P is calculated in accordance with the following equation:

$$T_i = TH_i + TL_i \tag{10}$$

Next, a flag (not shown) is checked to decide whether or not the current processing is still within the last three executions (step S5). If so, the processing proceeds to a memory content updating step S11, whereupon the B76° routine comes to an end.

Parenthetically, the above-mentioned flag is set until the third execution of the B76° routine and it is cleared upon the fourth execution thereof.

In the memory content updating step S11, the contents of the individual memory areas storing the lengths of the preceding H-level interval $TH_{i-1}$, L-level interval $TL_{i-1}$, the preceding period $T_{i-1}$ and the preceding time ratio $RT_{i-1}$ in the preceding engine cycle are updated to the values resulting from the current arithmetic operations mentioned above. After arithmetic determination of a current crankshaft acceleration $\alpha_i$ (described hereinafter), the values of the four preceding accelerations $\alpha_{i-1}$ to $\alpha_{i-4}$, which are obtained through the last four executions of the B76° routine and sequentially stored in the relevant memory areas, are updated correspondingly.

If the routines of FIGS. 4 and 5 are repeated and if it is decided in step S5 that the current routine corresponds to a fourth execution, then in step S6, the angular acceleration $\alpha_i$ is determined on the basis of the data obtained through the arithmetic processings executed up to the current time point using the following equation:

$$\alpha_i = (TH_i / T_i^3)(RT_i - RT_{i-1})$$

This acceleration calculating step S6 is executed every time the B76° routine is iterated, whereon the currently determined acceleration is stored along with the last four accelerations $\alpha_{i-1}$ to $\alpha_{i-4}$ in the associated memory areas, respectively.

At the time when the accelerations $\alpha_{i-1}$ to $\alpha_{i-4}$ are obtained for the last four engine cycles, respectively, the process goes to step S7 wherein a change $\delta\alpha_i$ between the current acceleration $\alpha_i$ and the preceding acceleration $\alpha_{i-4}$ at the current and the last ignition time points for the same cylinder is determined in accordance with the following equation:

$$\delta\alpha_i = \alpha_i - \alpha_{i-4} \tag{11}$$

Next, the change $\delta\alpha_i$ in the acceleration obtained from the above calculation is compared with a predetermined value $\beta$ to decide whether or not the change $\delta\alpha_i$ is greater than the predetermined value $\beta$ (step S8). When the change $\delta\alpha_i$ is greater than the predetermined value $\beta$, decision is made in step S9 that misfiring has taken place for the cylinder of concern (e.g., #1 cylinder). On the other hand, if the comparison shows that the change $\delta\alpha_i$ in the acceleration does not exceed the predetermined value $\beta$, it is then decided in step S10 that normal combustion takes place in the cylinder of concern.

Subsequently, in Step S11, the memory is updated as described above, and then the B76° routine is completed. Through the similar procedure, the program shown in FIG. 4 is again executed at the reference crank position B76° with the program of FIG. 5 being executed at the reference crank position B6° for making decision as to the occurrence of misfiring in the other cylinders.

Referring to FIG. 2D, it will be seen that at the time corresponding to a crank angle of 1080°, the acceleration $\alpha_i$ associated with the #1 cylinder increases beyond the previous acceleration $\alpha_{i-4}$ measured at the preceding time point (corresponding to a crank angle of 360°) for the same cylinder. This means that the change rate $\delta\alpha_i$ exceeds the predetermined value $\beta$. Accordingly, decision is made that misfiring has taken place in this #1 cylinder.

Next, referring to FIG. 6, description will be made of a second embodiment of the invention which is incarnated on the basis of the fact that changes in the angular acceleration $\alpha_i$ between the successive ignition time points for the four cylinders vary in dependence on the states of combustion within these cylinders.

Figure 6:
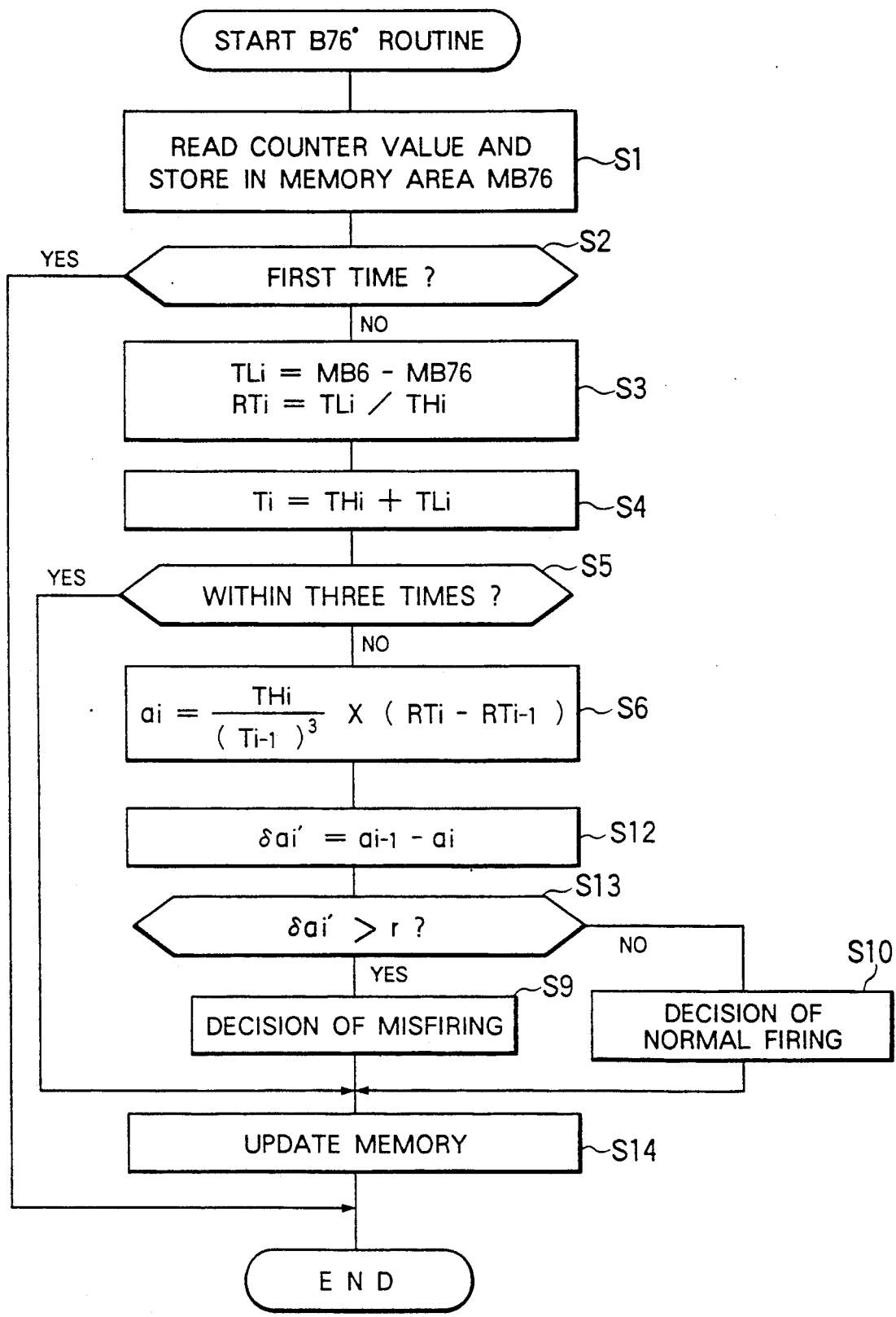
FIG. 6 is a flow chart showing a so-called B76° routine according to a second embodiment of the invention.

The flow chart shown in FIG. 6 differs from that of FIG. 4 only in a step S12 of calculating a change in the angular acceleration $\alpha_i$, a change comparison step S13 and a memory updating step S14 which correspond to steps S7, S8 and S11, respectively, of the previous embodiment. Other steps S1 to S6, S9 and S10 of FIG. 6 are the same as those of FIG. 4.

The memory updating step S14 is similar to the aforementioned step S11 except that only the acceleration $\alpha_{i-1}$ at the immediately preceding ignition time point for the engine as a whole (all the cylinders) is obtained and stored for comparison with the current acceleration $\alpha_i$. More specifically, it is sufficient to store only the current acceleration $\alpha_i$ and the preceding acceleration $\alpha_{i-1}$ in the memory 10. Further, the B6° routine is utterly the same as shown in FIG. 5.

The steps S1 to S4, S21 and S22 are iterated through the B76° routine (FIG. 4) and the B6° routine (FIG. 5) in the same manner as described previously. At the time point when the current and preceding values for $TH_i$, $T_{i-1}$, $RT_i$ and $RT_{i-1}$ have been obtained, the microcomputer 9 arithmetically determines a current acceleration $\alpha_i$ in accordance with the arithmetic operation shown in step S6 of FIG. 6.

Subsequently, the magnitude of a change or difference $\delta\alpha_i'$ between the current acceleration $\alpha_i$ and the preceding acceleration $\alpha_{i-1}$ is calculated in step S12 in accordance with the following equation:

$$\delta\alpha_i' = \alpha_{i-1} - \alpha_i \qquad (12)$$

Next, in step S13, the difference $\delta\alpha_i'$ resulting from the above calculation is compared with a predetermined value r to decide whether or not the change $\delta\alpha_i'$ is greater than the predetermined value r. If the change $\delta\alpha_i'$ is greater than the predetermined value r, it is determined in step S9 that misfiring has taken place. On the other hand, unless the value $\delta\alpha_i'$ is greater than the predetermined value r, it is then determined in step S10 that normal combustion has taken place in the cylinder last ignited.

Subsequently, the memory is updated with the newly calculated values in step S14, whereupon the B76° routine comes to an end. The B76° routine shown in FIG. 6 is executed at the reference crank position B76° (76° BTDC) while the B6° routine shown in FIG. 5 is executed at the reference crank position B6° (6° BTDC). In this way, detection of misfiring can successively be performed for the individual cylinders, respectively.

Referring to FIG. 2D, it will be seen that the preceding angular acceleration $\alpha_{i-1}$ at the ignition time point (corresponding to a crank angle of 1080°) for the #1 cylinder 2 increases remarkably, while the current angular acceleration $\alpha_i$ at the succeeding ignition time point (at a crank angle of 1260°) for the #3 cylinder 4 decreases significantly. Accordingly, at the time point corresponding to the crank angle of 1260°, it is determined that magnitude of the change $\delta\alpha_i'$ exceeds the predetermined value r, indicating the occurrence of misfiring.

Figure 7:
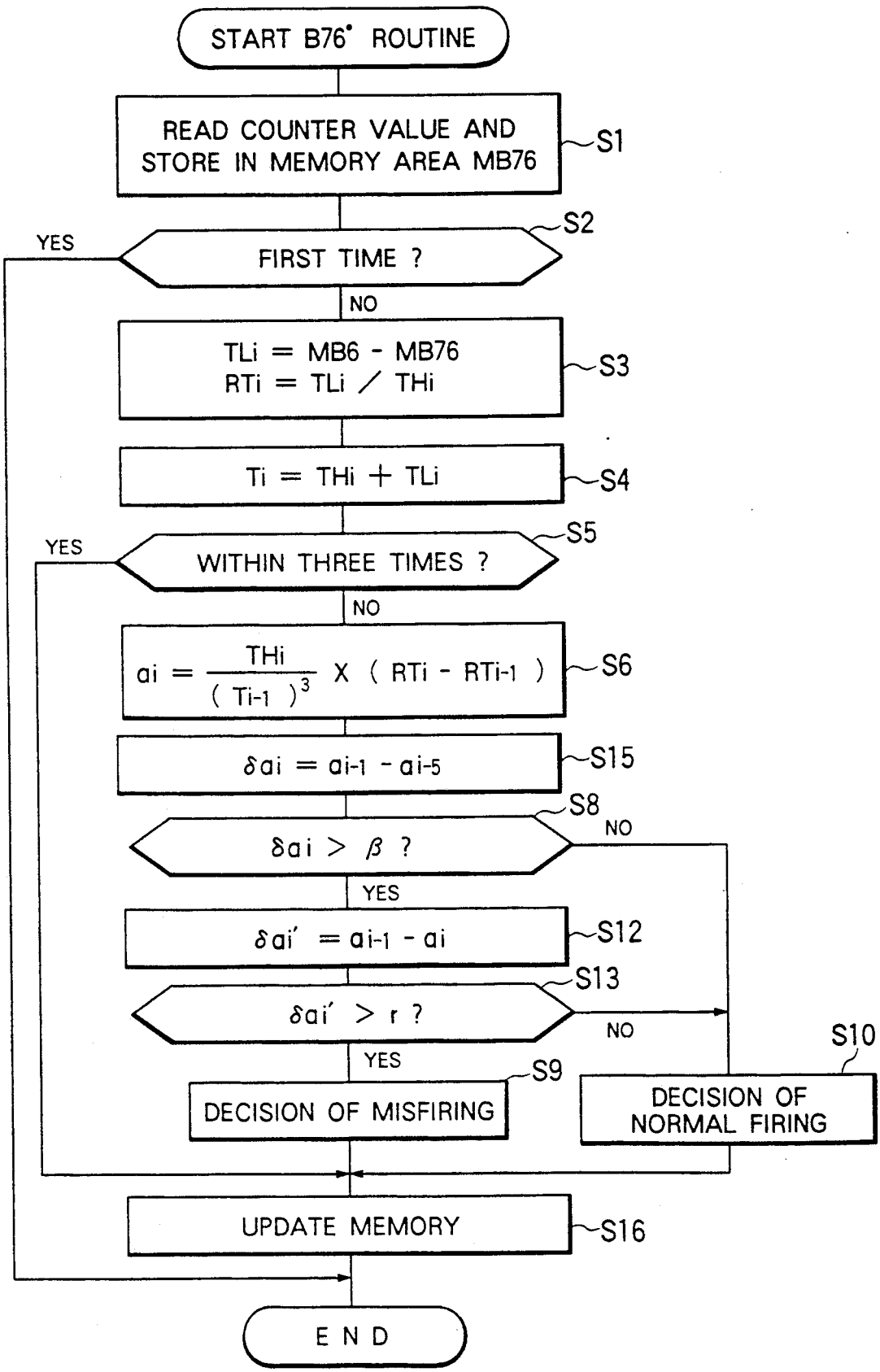
FIG. 7 is a flow chart showing a B76° routine according to a third embodiment of the invention.

Referring to FIG. 7, description will now be directed to a third embodiment of the present invention which corresponds to a profitable combination of the first and second embodiments described above.

The processing routine shown in FIG. 7 differs from those illustrated in FIGS. 4 and 6 only in an acceleration change calculating step S15 and a memory updating step S16 corresponding to the aforementioned steps S7 and S11, respectively. Other steps are the same as those described hereinbefore.

The memory updating step S16 differs from the aforementioned step S11 in that the accelerations $\alpha_{i-1}$ to $\alpha_{i-5}$ determined at the last five time points are successively stored. In other words, as the acceleration information, there are stored in the memory 10 the last five accelerations $\alpha_{i-1}$ to $\alpha_{i-5}$. The B6° routine is the same as that shown in FIG. 5.

In the case of the instant embodiment, the change $\delta\alpha_i$ of the acceleration associated with one and the same cylinder is termed a first change rate, the predetermined value $\beta$ is referred to as a first predetermined value, the change $\delta\alpha_1'$ in the acceleration associated with the succeeding cylinder is referred to as a second change rate, and the predetermined value r is referred to as a second predetermined value.

Since the cylinder corresponding to the preceding acceleration $\alpha_{i-1}$ (determined at 180° before the current acceleration) is subject to the misfiring decision, the first change rate $\delta\alpha_i$ for one and the same cylinder is calculated in step S15 in accordance with the following equation:

$$\delta\alpha_i = \alpha_{i-1} - \alpha_{i-5} \qquad (13)$$

at the time point when the last fifth acceleration $\alpha_{i-5}$ (at a crank angle of 900° before the current acceleration) is obtained after iteration of the acceleration determining step S6.

Subsequently, if it is decided in step S8 that the first change rate $\delta\alpha_i$ is smaller than the first predetermined value $\beta$, it is then determined in step S10 that normal combustion has taken place in the cylinder of concern. On the other hand, if the first change rate $\delta\alpha_i$ is not smaller than the first predetermined value $\beta$, then steps S12 and S13 are executed in succession.

More specifically, the second change rate $\delta\alpha_i'$ is arithmetically determined in accordance with the equation (12) in step S12, and then in step S13, it is compared with the second predetermined value r to make decision as to whether the second change rate $\delta\alpha_i'$ is greater than the second predetermined value r.

If the second change rate $\delta\alpha_i'$ is greater than the second predetermined value r, it is then decided in step S9 that misfiring has occurred in the cylinder of concern. If, however, the second change $\delta\alpha_i'$ is determined to be smaller than the second predetermined value r, it is decided in step S10 that normal combustion has taken place in the cylinder of concern.

In this way, the occurrence of misfiring is decided only when both the first and second change rates $\delta\alpha_i$ and $\delta\alpha_i'$ are greater than the respective predetermined values $\beta$, r.

Now, let us suppose that the angular velocity w of the engine undergoes remarkable variations due to external disturbances such as an unfavorable road condition and the like. In that case, there arises a possibility that the first change rate $\delta\alpha_i$ exceeds the first predetermined value $\beta$, whereas the second change rate $\delta\alpha_i'$ remains substantially unaffected below the second predetermined value r. Accordingly, useless control due to an erroneous misfiring detection is positively excluded, which means in turn that reliability in the misfiring detection is improved significantly.

Finally, referring to FIG. 8, a fourth embodiment of the present invention will be described which is capable of detecting the occurrence of external disturbances.

Figure 8:
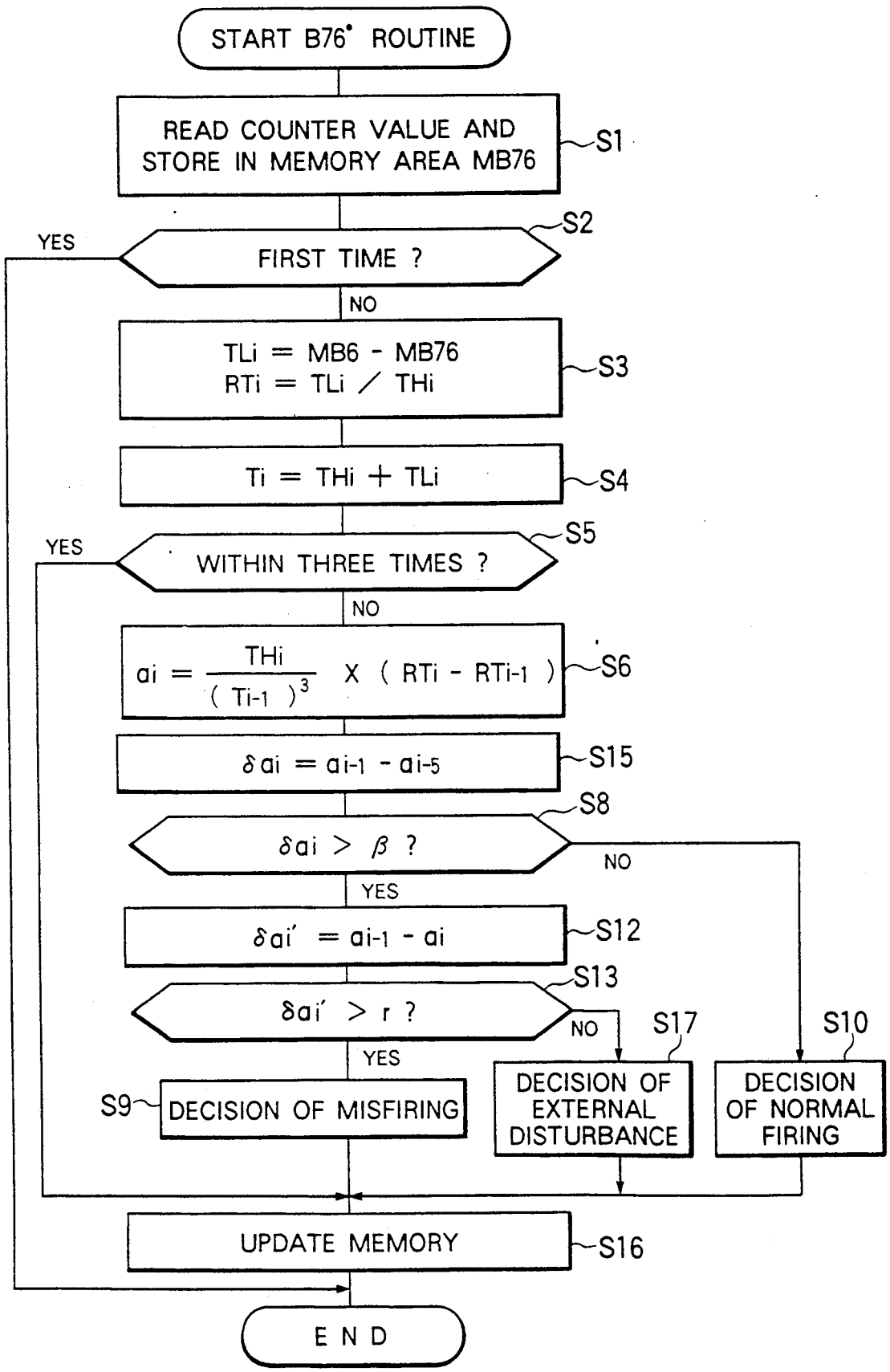
FIG. 8 is a flow chart showing a B76° routine according to a fourth embodiment of the invention.

The flow chart shown in FIG. 8 differs from that shown in FIG. 7 only in that a step S17 of determining the occurrence of an external disturbance is additionally provided. In that case, if it is decided in step S8 that the first change rate $\delta\alpha_i$ exceeds the first predetermined value $\beta$ and if it is decided in step S13 that the second change rate $\delta\alpha_i'$ is smaller than the second predetermined value r, the occurrence of an external disturbance is determined in step S17. Consequently, not only the useless misfiring detection processing can be avoided but also other control system (such as, for example, a suspension control apparatus) not shown can be maintained in the optimal state regardless of the occurrence of external disturbances.

In each of the embodiments described above, since the information required for the processing by the microcomputer 9 for making the misfiring decision is no more than the reference position signal P, the misfiring detecting apparatus can be implemented in a much simplified structure.

Although it has been assumed in the description of the embodiments that the predetermined values $\beta$ and r used in the decision of misfiring are fixed, they may be determined taking account of the mean value of a predetermined number of past accelerations or values derived through various averaging processing or statistical processing.

In conjunction with the processing step S9, it has been described that if the magnitude of a change in the acceleration has exceeded a predetermined value, it is only decided the occurrence of misfiring. It should, however, be appreciated that an arrangement for discriminatively identifying a misfiring cylinder may readily be adopted.

In a further modification of the invention, the predetermined values $\beta$, r used in misfiring decision may be stored separately for each of the cylinders, and the number of times misfiring has occurred within a predetermined period is defined as a misfiring ratio for each of the cylinders, so that the misfiring ratio for each cylinder may be displayed and/or used for performing misfiring suppression control only when the ratio exceeds a predetermined value.

Although the invention has been described in connection with the four-cylinder engine, it will readily be understood that the teachings of the invention can equally be applied to an engine having any number of cylinders inclusive of one or more cylinders.

While the invention has been described in terms of its preferred embodiments, it should be understood that numerous modifications may be made thereto without departing from the spirit and scope of the invention. It is intended that all such modifications fall within the scope of the appended claims.

What is claimed is:

1. A method of detecting the occurrence of misfiring in an internal combustion engine including at least one cylinder and a crankshaft operatively coupled to said cylinder, said method comprising the steps of:
   providing a pulse signal, representing angular positions of said crankshaft and having a first duration of a first level before a predetermined angular reference position of said crankshaft and a second duration of a second level after said predetermined angular reference position;
   successively determining an angular acceleration of said crankshaft at a predetermined crank position for said cylinder in accordance with a ratio of time amounts of said first and second durations of said pulse signal;
   determining a change between a current angular acceleration and a preceding angular acceleration of said crankshaft;
   comparing said change between the current and preceding angular accelerations with a predetermined value; and
   deciding the occurrence of misfiring in said cylinder when said change in the angular acceleration exceeds said predetermined value.

2. A method for detecting as claimed in claim 1, wherein said pulse signal is generated by a crank angle sensor coupled to said crankshaft.

3. A method for detecting as claimed in claim 1, wherein a computer performs said successive determinations of the angular acceleration and stores the angular accelerations in memory.

4. A method for detecting as claimed in claim 1, wherein said time amounts of said first and second durations are obtained by a computer based on said pulse signal output from a crank angle sensor coupled to the crankshaft and on an output of a timer in the computer.

5. A method of detecting the occurrence of misfiring in an internal combustion engine including at least one cylinder and a crankshaft operatively coupled to said cylinder, said method comprising the steps of:
   successively determining a time ratio representing a ratio between a first time taken for said crankshaft to rotate a first predetermined angular distance, extending in precedence to a predetermined angular reference position of said crankshaft, as indicated by a first level of a pulse signal representing angular positions of said crankshaft, and a second time taken for said crankshaft to rotate a second predetermined angular distance, extending in succession to said predetermined angular reference position, as indicated by a second level of said pulse signal;
   determining an angular acceleration of said crankshaft on the basis of a difference between the time ratios determined in current and preceding engine cycles, respectively;
   determining a change in said angular acceleration at a predetermined crank position of said cylinder;
   comparing said change in the angular acceleration with a predetermined value; and
   deciding the occurrence of misfiring in said cylinder when said change in the angular acceleration exceeds said predetermined value.

6. A method according to claim 1 or 5, wherein said predetermined crank position for said cylinder is an ignition point for said cylinder.

7. A method for detecting as claimed in claim 5, wherein said pulse signal is generated by a crank angle sensor coupled to said crankshaft.

8. A method for detecting as claimed in claim 5, wherein a computer performs said successive determinations of the angular acceleration and stores the angular accelerations in memory.

9. A method for detecting as claimed in claim 5, wherein said first and second times are obtained by a computer based on said pulse signal output from a crank angle sensor coupled to the crankshaft and on an output of a timer in the computer.

10. A method of detecting the occurrence of misfiring in an internal combustion engine including a plurality of cylinders operating in a predetermined sequence and a crankshaft operatively coupled to said cylinders, said method comprising the steps of:
    determining a time ratio representing a ratio between a first time taken for said crankshaft to rotate a first predetermined angular distance, extending in precedence to a predetermined angular reference position of said crankshaft, as indicated by a first level of a pulse signal representing angular positions of said crankshaft, and a second time taken for said crankshaft to rotate a second predetermined angular distance, extending in succession to said angular reference position, as indicated by a second level of said pulse signal;

determining an angular acceleration of said crankshaft on the basis of a difference between the time ratios determined in successive engine cycles;

successively determining a change in the angular acceleration at a predetermined crank position for each of said cylinders;

comparing said change in the angular acceleration with a predetermined value; and deciding the occurrence of misfiring in one of said cylinders which was last ignited if said change in the angular acceleration exceeds said predetermined value.

11. A method according to claim 10, wherein said predetermined crank position for each of said cylinders is an ignition point for each cylinder.

12. A method for detecting as claimed in claim 10, wherein said pulse signal is generated by a crank angle sensor coupled to said crankshaft.

13. A method for detecting as claimed in claim 10, wherein a computer performs said successive determinations of the angular acceleration and stores the angular accelerations in memory.

14. A method for detecting as claimed in claim 10, wherein said first and second times are obtained by a computer based on said pulse signal output from a crank angle sensor coupled to the crankshaft and on an output of a timer in the computer.

15. A method of detecting the occurrence of misfiring in an internal combustion engine including a plurality of cylinders operating in a predetermined sequence and a crankshaft operatively coupled to said cylinders, said method comprising the steps of:

determining a time ratio representing a ratio between a time taken for said crankshaft to rotate a first predetermined angular distance extending in precedence to a predetermined angular reference position of said crankshaft and a time taken for said crankshaft to rotate a second predetermined angular distance extending in succession to said angular reference position;

determining an angular acceleration of said crankshaft on the basis of a difference between the time ratios determined in current and preceding engine cycles, respectively;

determining a first quantity representing a change in said angular acceleration at a first predetermined crank position for a given one of said cylinders;

comparing said first quantity with a first predetermined value;

determining a second quantity representing a change in said angular acceleration at a second predetermined crank position for a succeeding cylinder operating in succession to said given cylinder;

comparing said second quantity with a second predetermined value; and deciding the occurrence of misfiring in one of said cylinders which was last ignited if said first quantity exceeds said first predetermined value and if said second quantity exceeds said second predetermined value.

16. A method for detecting as claimed in claim 15, wherein said successively determined angular accelerations are obtained based on a pulse signal generated by a crank angle sensor coupled to said crankshaft, said pulse signal representing an angular position of the crankshaft.

17. A method for detecting as claimed in claim 15, wherein a computer performs said successive determinations of the angular acceleration and stores the angular accelerations in memory.

18. A method for detecting as claimed in claim 15, wherein said successively determined angular accelerations are obtained by a computer based on an output signal from a crankshaft angle sensor coupled to the crankshaft and on an output of a timer in the computer.

19. A method according to claim 15, wherein said predetermined crank position for a given one of said cylinders is an ignition point for said given cylinder.

20. A method according to claim 15, wherein if said first quantity is greater than said first predetermined value and if said second quantity is smaller than said second predetermined value, it is decided that an external disturbance affecting engine operation takes place.

21. An apparatus for detecting the occurrence of misfiring in an internal combustion engine including at least one cylinder and a crankshaft operatively coupled to said cylinder, said apparatus comprising:

a crank angle sensor for generating a pulse signal representative of angular positions of said crankshaft, said pulse signal having a first duration of a first level before a predetermined angular reference position of said crankshaft and a second duration of a second level after said predetermined angular reference position; and an arithmetic unit operable to process said pulse signal for making decision as to the occurrence of misfiring in said cylinder;

said arithmetic unit comprising;

means for successively determining a time ratio representing a ratio between said first and second durations of said pulse signal;

means for determining an angular acceleration of said crankshaft on the basis of a difference between the time ratios determined in current and preceding engine cycles, respectively;

means for determining a change in said angular acceleration at a predetermined crank position for said cylinder;

means for comparing said change in said angular acceleration with a predetermined value; and means for deciding the occurrence of misfiring in said cylinder if said change in said angular acceleration exceeds said predetermined value.

22. An apparatus for detecting the occurrence of misfiring in an internal combustion engine including at least one cylinder and a crankshaft operatively coupled to said cylinder, said apparatus comprising;

a crank angle sensor for generating a pulse signal representative of angular positions of said crankshaft, said pulse signal having a first duration of a first level before a predetermined angular reference position of said crankshaft and a second duration of a second level after said predetermined angular reference position; and an arithmetic unit operable to process said pulse signal for making decision as to the occurrence of misfiring in said cylinder;

said arithmetic unit comprising;

means for successively determining a time ratio representing a ratio between said first and second durations of said pulse signal;

means for determining an angular acceleration of said crankshaft on the basis of a difference between the time ratios determined in successive engine cycles;

means for successively determining a change in said angular acceleration at a predetermined crank position for each of said cylinders;

means for comparing said change in said angular acceleration with a predetermined value; and means for deciding the occurrence of misfiring in one of said cylinders which was last ignited if said change in said angular acceleration exceeds said predetermined value.

23. An apparatus for detecting the occurrence of misfiring in an internal combustion engine including at least one cylinder and a crankshaft operatively coupled to said cylinder, said apparatus comprising:

a crank angle sensor for generating a pulse signal representative of angular positions of said crankshafts, said pulse signal having a first duration of a first level before a predetermined angular reference position of said crankshaft and a second duration of a second level after said predetermined angular reference position; and an arithmetic unit operable to process for making decision as to the occurrence of misfiring in said cylinder;

said arithmetic unit comprising;

means for successively determining a time ratio representing a ratio between said first and second durations of said pulse signal;

means for determining an angular acceleration of said crankshaft on the basis of a difference between the time ratios determined in current and preceding engine cycles, respectively;

means for determining a first quantity representing a change in said angular acceleration at a first predetermined crank position for a given one of said cylinders;

means for comparing said first quantity with a first predetermined value;

means for determining a second quantity representing a change in said angular acceleration at a second predetermined crank position of a succeeding cylinder operating in succession to said given one cylinder;

means for comparing said second quantity with a second predetermined value; and means for deciding the occurrence of misfiring in one of said cylinders which was last ignited if said first quantity exceeds said first predetermined value and if said second quantity exceeds said second predetermined value.

24. A misfiring detecting apparatus according to claim 23, further comprising means for deciding that an external disturbance affecting engine operation takes place if said first quantity is greater than said first predetermined value and if said second quantity is smaller than said second predetermined value.

* * * * *